Patented Feb. 14, 1950

2,497,248

UNITED STATES PATENT OFFICE

2,497,248

PROCESS OF DEALKYLATING ALKOXY AROMATIC AMINES

Curt G. Vogt, Union, N. J., and Franz Marschall, Easton, Pa., assignors to General Aniline & Film Corporation, New York, N. Y., a corporation of Delaware No Drawing. Application November 1, 1946, Serial No. 707,328

7 Claims. (Cl. 260—575)

This invention relates to a process of dealkylating alkoxy aromatic amines by the action of an aluminum halide at elevated temperatures.

This application is a continuation-in-part of our copending application Serial No. 576,708, filed February 7, 1945, now abandoned.

It is known to dealkylate alkoxy aromatic compounds by treatment thereof with aluminum chloride at elevated temperatures, Houben, Die Methoden der Organischen Chemie, 3rd edition (1930) 3, 176. It is also known to dealkylate alkoxy aromatic amines by subjecting the alkoxy compound as the free amine to the action of aluminum chloride at elevated temperatures, British Patent 479,865. The reaction is useful for the preparation of hydroxylated aromatic compounds, the dealkylated product—aluminum chloride complex formed in the reaction being subjected to hydrolysis for this purpose.

The present invention has for an object improvement in the known process of dealkylating alkoxy aromatic amines by the action of an aluminum halide at elevated temperatures whereby the yield of the hydroxylated aromatic amine obtained on subsequent hydrolysis of the complex formed between the dealkylation product and the aluminum halide is increased. To this end, the invention comprises a dealkylating process wherein the alkoxy aromatic amine in the form of its salt with a strong mineral acid which is non-oxidizing in respect to the conditions of the reaction is subjected to the action of the aluminum halide at elevated temperatures. Suitable mineral acids for the formation of the amine salt are the halogen acids, i. e., hydrochloric, hydrobromic, hydriodic and hydrofluoric acid, sulfuric acid and phosphoric acid. Preferably, the hydrochloride salt of the alkoxy aromatic amine is employed. Following the process as thus modified, a greater yield of the dealkylated aromatic amine can be obtained than when operating according to the prior art process wherein the alkoxy aromatic amine is introduced into the reaction mixture in the form of the free amine.

The dealkylating reaction in accordance with the present invention can be carried out by providing a reaction mass which is fluid at reaction temperatures for which, preferably, an inert liquid organic diluent is employed. The aluminum halide, which suitably is aluminum chloride or aluminum bromide, is preferably present in the reaction mixture in excess of the alkoxy aromatic amine. The temperature at which the dealkylation is effected may vary and suitably may be from about 70° C. to about 220° C. employing a liquid organic diluent, the upper limit of temperature being dependent upon the boiling point of the organic diluent. In many instances, using a liquid organic diluent, the reaction can be conveniently carried out by operating at the reflux temperature of the reaction mixture. Suitable inert liquid organic diluents, are, for example, benzene, nitrobenzene, toluene, nitrotoluene, xylene and the like.

If it is desired to carry out the reaction at temperatures above about 160° C. it is preferable to employ a double salt of the aluminum halide as the combined reactant and diluent. Operating in this way, it is possible to carry out the reaction at temperatures which range upwardly to the boiling point or decomposition temperature of the reactants, for example, as high as 300° C. or higher. Examples of double salts of aluminum halides which may be employed are those formed from aluminum chloride or aluminum bromide with respectively, amonium chloride, lithium chloride, sodium chloride, potassium chloride, sodium bromide, potassium bromide, cuprous chloride, silver chloride, barium chloride, magnesium chloride, stannous chloride, antimony trichloride, manganous chloride and the like.

The process of the invention may be applied to advantage in dealkylating mono- or polynuclear alkoxy aromatic amines containing one or more alkoxy and amino groups and which, otherwise, are unsubstituted or contain only such substituents as do not adversely affect the dealkylation, such as alkyl groups. Preferred of such alkoxy aromatic amines are those of the benzene and diphenyl series, more particularly dianisidine from which by subsequent hydrolysis of the dealkylated dianisidine-aluminum halide complex can be obtained the valuable dye intermediate, dihydroxybenzidine. Among other alkoxy aromatic amines of the foregoing kind may be specifically mentioned, for example, ortho, meta and para-anisidine, 4-chloro-o-anisidine, 4-nitro-o-anisidine, 3-amino-4-methoxytoluene, 3,6-dimethoxyaniline, 2 - ethoxy - 1 - naphthylamine, 4-amino-3-methoxy carbazole and the like.

The product of the dealkylating process is recovered as an hydroxylated aromatic amine by pouring the cooled reaction mass into water which has been acidified with a mineral acid customarily employed for acid hydrolysis, such as hydrochloric or sulfuric acid. Suitably, for the hydrolysis, a volume of the aqueous dilute acid solution equal to or in excess of the volume of the reaction mass may be used. Where a liquid organic diluent has been used in the dealkylating reaction this may be removed from the aqueous solution of the hydrolyzed product by steam-distillation and the hydroxylated aromatic amine precipitated from the aqueous solution in the form of a salt such as the sulfate or hydrochloride.

The alkyl groups split off in the dealkylating reaction on cleavage of the alkoxy group or groups form alkyl halides with the anion of the aluminum halide employed. The alkyl halides of low boiling point such as methyl chloride or bromide and ethyl chloride or bromide volatilize off from the reaction and are of high purity.

The invention is further illustrated by the following specific examples to which, however, it is not to be limited. Parts are by weight. It is to be understood that in conducting the process, anhydrous or nearly anhydrous conditions should be maintained in accordance with sound practice.

Example 1

50 parts of dianisidine dihydrochloride are charged into 330 parts of toluene contained in a suitable reaction vessel equipped with a stirrer and a reflux condenser. 210 parts of aluminum chloride are added under good agitation. The mixture is heated to refluxing temperature for about one-quarter hour, and then cooled to about 80° C. 25 parts of dianisidine dihydrochloride are added and the mixture heated to a slight refluxing. After about one-quarter hour, the mass is again cooled to about 80° C. and a further 25 parts of dianisidine dihydrochloride added. The mixture is again heated to refluxing where it is held for about two hours, after which time the reaction is complete. The lowering of the temperature before each addition of dianisidine dihydrochloride is preferred to prevent violent reaction. During the reaction methyl chloride is formed and escapes from the reaction mass. The reaction mass is cooled and poured into water, which results in hydrolyzing the dealkylated dianisidine-aluminum chloride complex. With the addition of hydrochloric acid to keep the aluminum salts in solution, the aqueous mass from the hydrolysis is subjected to steam-distillation to remove the toluene. To the resulting aqueous solution, which is substantially free from toluene, sodium sulfate is added to precipitate the dihydroxybenzidine, which in the form of its sulfate is separated by filtration. The yield of dihydroxybenzidine is about 94% of theory. Starting with dianisidine, the yield of the product is about 82%.

Example 2

48.8 parts o-anisidine hydrochloride is charged in quarter portions into a well stirred mixture of 330 parts toluene and 102.4 parts anhydrous aluminum chloride. The mixture is refluxed for 2 hours and then poured into water. Hydrochloric acid is added and the toluene removed from the mixture by steam-distillation. The aqueous residue is made alkaline with sodium hydroxide and again steam distilled. The aqueous alkaline residue is then made acid, 10 parts Nuchar added and the mixture boiled and filtered. The o-aminophenol is precipitated by the addition of sodium carbonate. The yield of o-aminophenol is about 98% of theory.

Example 3

48.8 parts p-anisidine hydrochloride is charged in quarter portions into 330 parts toluene and 102.4 parts anhydrous aluminum chloride and treated and worked up as described in Example 2. The yield of p-aminophenol is about 100% of theory.

Example 4

53.4 parts of 3-amino-4-methoxy-toluene-hydrochloride is charged in quarter portions into 330 parts toluene and 102.4 parts anhydrous aluminum-chloride and heated for 2 hours to reflux. The working up is the same as in Example 2. The yield of 3-amino-4-hydroxy-toluene is about 97-98% of theory, as compared to a yield of about 85% obtained when starting with the free amine.

Example 5

A mixture of 96 parts sodium chloride and 218 parts aluminum chloride is melted together at about 160° C. After raising the temperature of the melt to about 195 to 200° C., 65 parts dianisidine dihydrochloride is added and the reaction mass maintained at this temperature with agitation for about two hours and then drowned in about 2,000 parts of water. To the aqueous mixture with stirring is added about 84 parts concentrated hydrochloric acid, and then about 300 parts of sodium sulphate to precipitate the dihydroxybenzidine in the form of its sulphate. The mass is cooled, filtered and washed with a 10% sodium sulphate solution.

As various other embodiments of the invention will occur to those skilled in the art, it is not intended that the scope of the patent be limited except as is required by the prior art and the appended claims.

We claim:

1. In a process of dealkylating an alkoxy aromatic amine by heating the amine in the presence of a inert liquid diluent with a compound selected from the group consisting of aluminum chloride and aluminum bromide at elevated temperatures, the improvement which comprises conducting the reaction by employing in place of the free alkoxy aromatic amine the salt thereof with a mineral acid selected from the group consisting of the halogen acids, sulfuric acid and phosphoric acid said temperature being in the range 70° C. to the boiling point of the diluent or the decomposition point of the amine, whichever is lower.

2. A process of dealkylating an unsubstituted alkoxy alkylaryl amine which comprises heating the amine in the form of the salt of a mineral acid selected from the group consisting of the halogen acids, sulfuric acid and phosphoric acid with aluminum chloride at a temperature in the range 70° to 220° C. in the presence of an inert liquid diluent.

3. A process of dealkylating an unsubstituted alkoxy armoatic amine which comprises heating the amine in the form of the salt of a mineral acid selected from the group consisting of the halogen acids, sulfuric acid and phosphoric acid with aluminum chloride at a temperature in the range 70° to 220° C. in the presence of an inert liquid diluent.

4. A process of dealkylating an unsubstituted alkoxy phenylamine which comprises heating the amine in the form of the salt of a mineral acid selected from the group consisting of the halogen acids, sulfuric acid and phosphoric acid with aluminum chloride at a temperature in the range 70° to 220° C. in the presence of an inert liquid diluent.

5. A process of dealkylating an unsubstituted alkoxy diphenylamine which comprises heating the amine in the form of the salt of a mineral acid selected from the group consisting of the halogen acids, sulfuric acid and phosphoric acid with aluminum chloride at a temperature in the range 70° to 220° C. in the presence of an inert liquid diluent.

6. A process which comprises heating dianisidine dihydrochloride with aluminum chloride at a temperature in the range 70° to 220° C. in the presence of an inert liquid diluent.

7. A process of preparing dihydroxybenzidine which comprises completely dealkylating dianisidine by heating the dihydrochloride thereof with aluminum chloride in the presence of a inert liquid diluent at an elevated temperature and hydrolyzing the resulting dealkylated dianisidene-aluminum chloride complex said temperature in the range 70° C. to the boiling point of the diluent or the decomposition point of the amine, whichever is lower.

CURT G. VOGT.
FRANZ MARSCHALL.

REFERENCES CITED

The following references are of record in the file of this patent:

UNITED STATES PATENTS

| Number | Name | Date |
|---|---|---|
| 2,276,618 | Kulz | Mar. 17, 1942 |
| 2,276,619 | Kulz | Mar. 17, 1942 |

FOREIGN PATENTS

| Number | Country | Date |
|---|---|---|
| 479,865 | Great Britain | Feb. 14, 1938 |

OTHER REFERENCES

Stoemer: "Ber. deut. Chem.," 41, 321–324 (1908).

Kolhatkar et al.: "Chem. Ab.," 26, page 113 (1932).

Popov: "Chem. Ab.," 30, page 1049 (1936).

Fieser et al., "Organic Chemistry" (D. C. Heath and Co., Boston, 1944), page 639.